Figure 1:
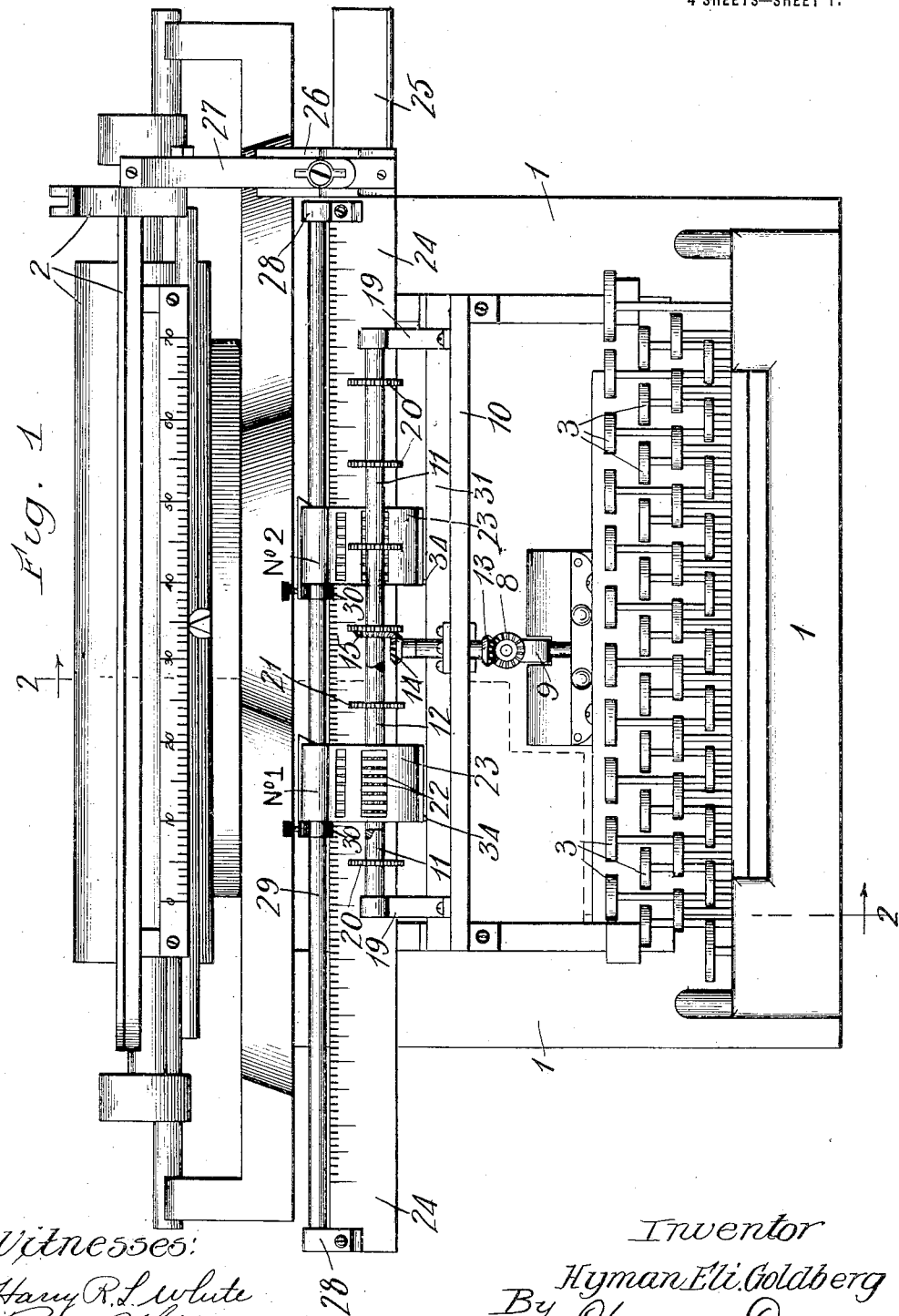

H. E. GOLDBERG.
CALCULATING MACHINE.
APPLICATION FILED AUG. 25, 1905.

1,204,755.

Patented Nov. 14, 1916.
4 SHEETS—SHEET 1.

Witnesses:
Harry R. L. White
Ray White

Inventor
Hyman Eli Goldberg
By Cheever & Cox
Atty's

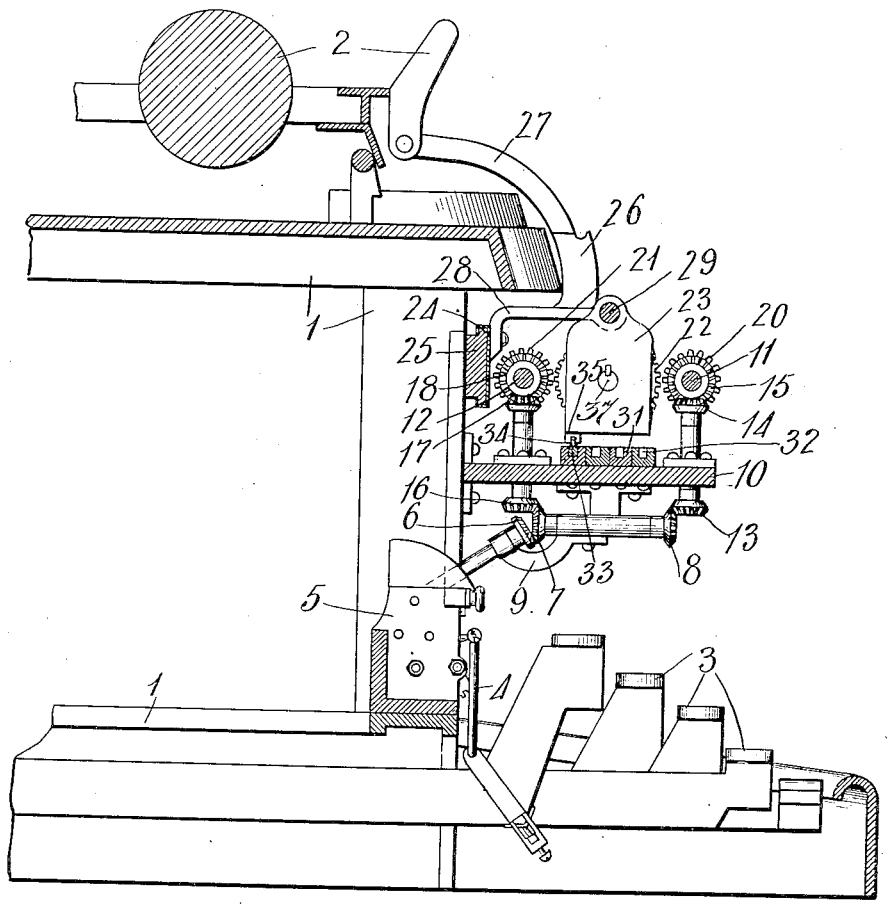

H. E. GOLDBERG.
CALCULATING MACHINE.
APPLICATION FILED AUG. 25, 1905.
1,204,755.
Patented Nov. 14, 1916.
4 SHEETS—SHEET 3.
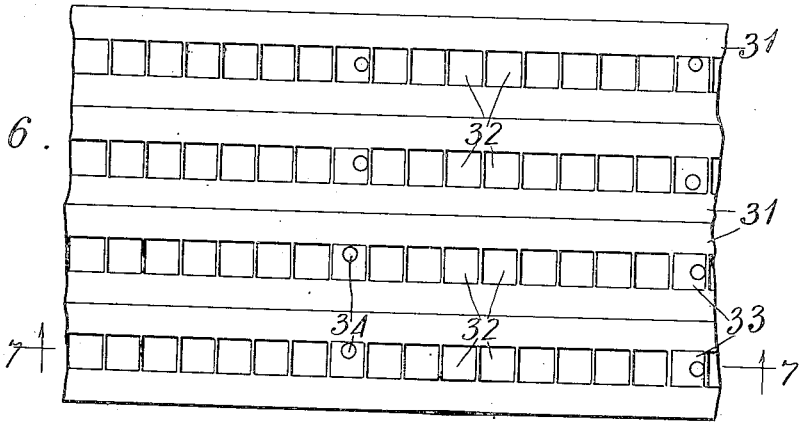
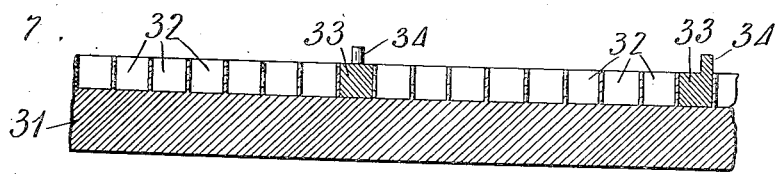
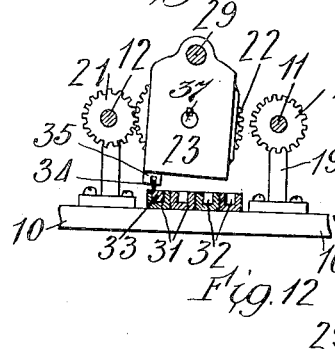
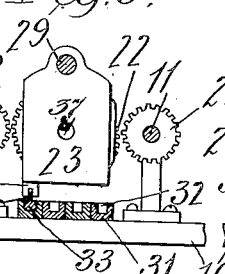
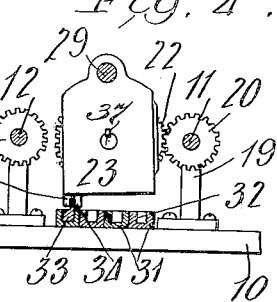
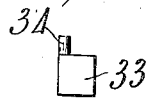
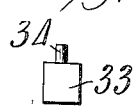
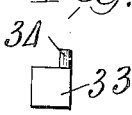
Witnesses:
Harry R. L. White
Ray White
Inventor
Hyman E. W. Goldberg
By Cheever & Cox
Atty's

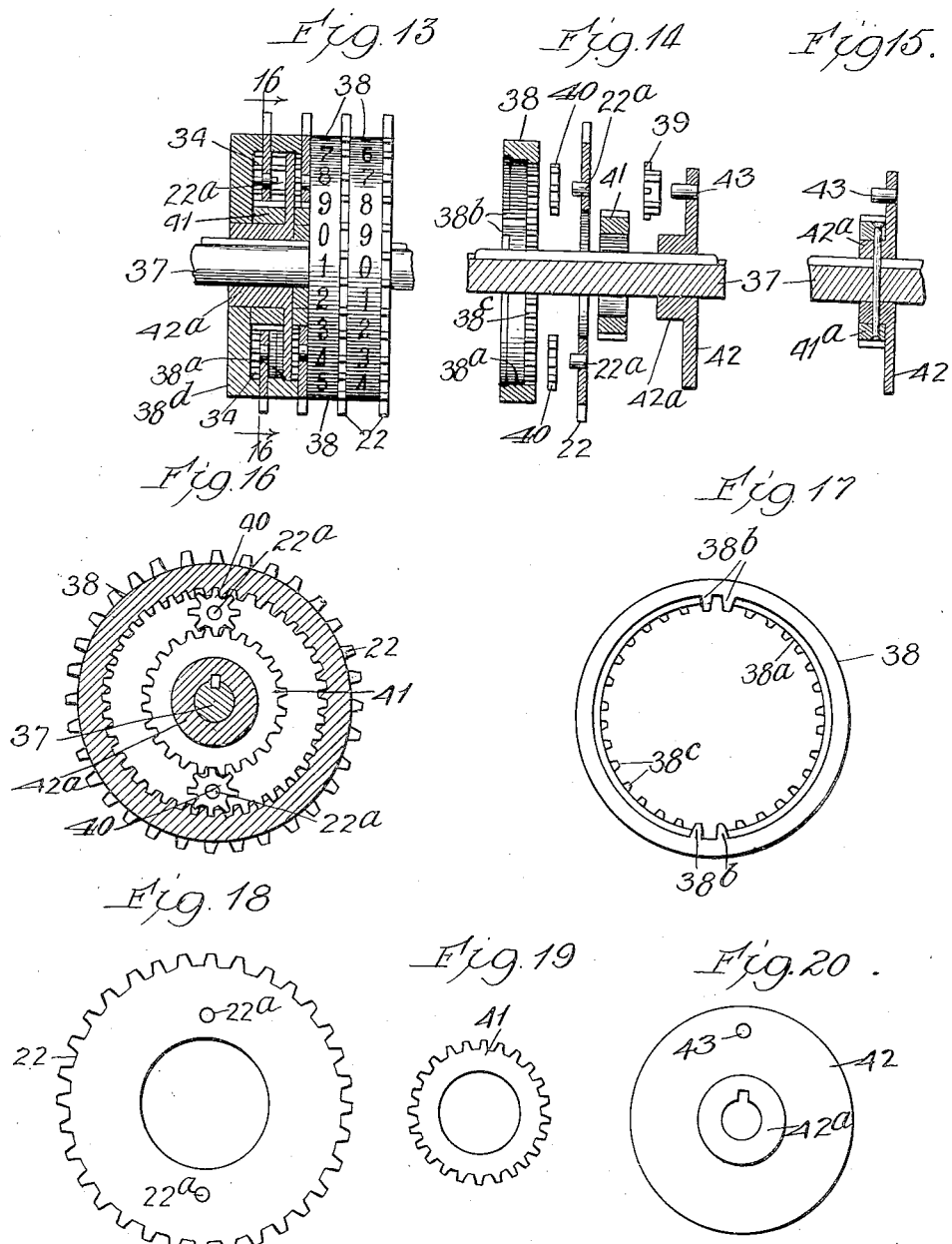

UNITED STATES PATENT OFFICE.

HYMAN ELI GOLDBERG, OF CHICAGO, ILLINOIS, ASSIGNOR TO GOLDBERG CALCULATING MACHINE COMPANY, A CORPORATION OF ILLINOIS.

CALCULATING-MACHINE.

1,204,755.      Specification of Letters Patent.      Patented Nov. 14, 1916.

Application filed August 25, 1905. Serial No. 275,760.

*To all whom it may concern:*

Be it known that I, HYMAN ELI GOLDBERG, a citizen of the United States, residing at Chicago, in the county of Cook and State of Illinois, have invented a certain new and useful Improvement in Calculating-Machines, of which the following is a specification.

My invention relates to calculating machines including attachments to typewriters; and embodies certain improvements in and additions to the mechanism shown in the patent application filed by me May 28th, 1904, Serial No. 210,158. In that application there is shown a totalizing or receiving mechanism and actuating means therefor, one of which travels relatively to the other, and means moving in unison with the part that travels so constructed that the position it is adjusted to controls whether the connections between the totalizing mechanism and the actuating means shall or shall not be established, in other words, whether the totalizing mechanism shall or shall not operate.

One of the objects of the present invention is to widen the scope of the machine and increase its possibilities for usefulness by providing controlling means so constructed that it determines not only as to whether the totalizing mechanism shall operate or not, but as to whether it shall add, substract or not operate.

This machine is capable of calculating in more than one column, for which reason it is especially useful as a billing machine, and as a result of this present invention, it is possible without changing the direction of rotation of the primary universal valuating members for the totalizing mechanism to add in one column, subtract in another and pass by another without being acted upon. By the term primary universal valuating members is meant such members as respond to the actions of all of the numeral keys and have a movement proportional in amount to the value of the key temporarily acting upon them.

The above mentioned principle of the invention is applicable whether there is one or a plurality of totalizing mechanisms employed, but it is obvious that unless special provision is made, after the controlling device is once set, all of the totalizing mechanisms would act the same way at any given column. In view of this fact another object of my invention is to provide means whereby for example, totalizing mechanism No. 1 will add in column No. 1, substract in column No. 2 and remain idle in column No. 3, etc., while totalizing mechanism No. 2 will subtract in column No. 1, add in column No. 2 and add in column No. 3 or produce any other combination of results.

Another object of the present invention is to provide a controlling device which is positive in its operation, avoiding the use of springs or other possible sources of error.

These objects are attained by the mechanism illustrated in the accompanying drawings in which:

Figure 1 is a general front view of a machine embodying my invention and attached to a typewriter. Fig. 2 is a transverse sectional view taken on line 2—2 Fig. 1. Figs. 3, 4 and 5 are views of the totalizing mechanism and operating and controlling parts, the figures showing the totalizing mechanism in positions to add; to subtract; and not operate. Fig. 6 is a top view on an enlarged scale of the pins and pin holder for controlling the totalizing mechanism. Fig. 7 is a sectional view of said device on line 7—7 Fig. 6. Fig. 8 is a bottom view of four different totalizing mechanisms showing the cams which coöperate with the pins of Figs. 6 and 7 and elsewhere to control the totalizing mechanism. The scale of Fig. 8 is smaller than that of Figs. 6 and 7 and is approximately equal to that of Figs. 3, 4, and 5. Figs. 9, 10 and 11 are side elevations of a controlling pin, looking at three different sides thereof. Fig. 12 shows a form of clip whereby a totalizing mechanism may be adjusted to any desired position upon its supporting bar. Fig. 13 is a front or face assembly view partly in section of the totalizing mechanism indicated in Fig. 1 and elsewhere in the drawings and described in Patent No. 782,605 issued to me February 14, 1905, for totalizing mechanism. Fig. 14 is a sectional view of the parts shown in Fig. 13. In this view the parts are not assembled, but are arranged in a group for the purpose of illustrating the relationship of the parts. Fig. 15 is a sectional view of the intermediate wheel located farthest to the right. This wheel is non-rotatable and is shown to be pinned to the axle, whereas the intermediate wheels to the left thereof in the totalizing mechanism are rotatable. Fig. 16 is a sectional view taken on line 16—16 Fig. 13. Figs. 17, 18, 19 and 20 are views of component parts of the totalizing mechanism.

Similar numerals refer to similar parts throughout the several views.

Referring to the drawings, 1 represents the framework of a typewriter having a laterally shiftable carriage 2 and vertically movable keys 3. Such ones of said keys as are numeral keys are connected by means of links 4 or otherwise to an appropriate part of the valuating mechanism 5. The precise construction of said valuating mechanism is immaterial, its function being to drive gear wheel 6 different amounts depending upon the value of the key temporarily in action. A suitable form of valuating mechanism is fully described in the patent issued to me Feb. 14, 1905 No. 782,554.

Wheel 6 rotates always in the same direction and is adapted to drive the wheels 7 and 8 which are connected together so as to rotate as a single piece. In the present instance they are journaled in the hanger 9 secured to the stationary bracket 10, said bracket being bolted or otherwise secured to the framework 1.

From wheels 7 and 8 connections are provided for rotating the setting-wheel shafts 11 and 12; and in the construction illustrated these connections comprise the miter gear wheels 13, 14, 15, 16, 17 and 18, gear wheels 13 and 14 rotating as a single piece and operating to drive the gear wheel 15 which is rigidly fixed on shaft 11. Gear wheels 16 and 17 rotate as a single piece and operate to drive the gear wheel 18 which is rigidly fixed on shaft 12. The axes of wheels 13, 14, 16 and 17 are stationary and in the present design of the machine are vertical and said wheels are journaled in suitable bearings mounted on bracket 10.

Shafts 11 and 12 have axes parallel to the path of the traveling carriage 2, and in the present instance are journaled in the bearings 19 mounted on bracket 10. Shaft 11 has rigidly fixed thereon a set of spur wheels 20, and similarly shaft 12 has rigidly fixed thereon a set of spur wheels 21, said wheels being designed to operate the receiving or accumulating wheels 22 of the receiving mechanisms 23. The arrangement is such that each wheel 20 is directly opposite to its respective wheel 21, but at such a distance therefrom that a receiving wheel is never in mesh with both operating wheels at once but may be in mesh with either one or out of mesh with both. Shafts 11 and 12 rotate in opposite directions and hence cause the receiving wheels to rotate in opposite directions. The totalizing mechanism adds when operated in one direction and subtracts when operated in the opposite direction, and although the precise construction of the totalizing mechanism is immaterial a suitable construction is shown in Patent No. 782,605 issued to me Feb. 14, 1905.

Another form of totalizer which readily lends itself for adaptation into this machine is the one shown in Patent No. 741,961 issued to me Oct. 20, 1903. The operating wheels 20 and 21, which may be termed setting wheels occur at intervals upon their respective shafts, the distance between any two wheels upon the same shaft determining the distance between the same decimal places in the different columns on the recording sheet of paper.

In the present construction the wheels have stationary axes and the totalizing mechanism moves bodily transversely to said axes for connecting with one setting wheel to add or with the opposite one to subtract or with neither to not operate. In addition to its bodily movement transverse to the axes of the setting wheels the totalizing mechanism shifts or travels laterally with the carriage 2, and the means for accomplishing these movements will now be described.

A bar or slide 24 is slidingly mounted upon the stationary guide bar 25 in such a manner that it may travel in a direction parallel to the axes of the setting wheels 20, 21. In the preferred form the traveling motion of the carriage is imparted directly to the slide 24 by means of a socket or keeper 26 fastened to said slide and adapted to disconnectably engage the arm 27 fastened to the carriage.

Rigidly fastened to slide 25, preferably by means of brackets 28 thereon is a bar 29 which lies parallel to the axes of the setting wheels and is adapted to support one or more totalizing mechanisms. Said totalizing mechanisms are so mounted upon said bar as to travel with the same but be independently movable transversely to the setting wheel axes. In order to provide means whereby the totalizing mechanism may be adjusted lengthwise of bar 29, a clip 30, shown in Figs. 1 and 12, is mounted on said bar and so constructed as to straddle the totalizing mechanism without interfering with its transverse movement, and at the same time said clip prevents lateral movement. The clip may be set in any desired position by means of a set screw or otherwise. In the preferred construction bar 29 is cylindrical and located approximately midway between shafts 11 and 12 and somewhat above them so that the totalizing mechanisms may be swung from side to side upon the bar as a pivot and the center of the receiving wheels will come approximately upon a level with the centers of the setting wheels. The controlling means here shown for causing the establishment or disestablishment of connection between the totalizing mechanism and the operating means is a cam device with cam track traveling in unison with the traveling part of the machine. In this device 31 represents a set of stationary holders, preferably mounted on bracket 10 beneath the path of the totalizing mechanisms. Each holder has a set of pockets 32 arranged in a row parallel with said path of the totalizing mechanisms and adapted to receive the bases 33 of the cam pins 34. By preference the bases of said pins are square when viewed in plan and so also are said pockets 32 in order that the bases may fit the pockets in any one of four positions. As a result of this construction taken in connection with the fact that said pins are set eccentrically upon their bases, as best shown in Figs. 6, 7, 9, 10 and 11, they may be set in three different positions relatively to the path of travel of the totalizing mechanism. Consequently the pins are not only removable and renewable, but are interchangeable, a single form of pin being adequate to all three requirements, to-wit, for causing the totalizing mechanism to travel a middle path, or a path at either side thereof, and consequently maintaining the totalizing mechanism out of connection with its operating wheels as shown in Fig. 5, or in connection with either one of them as shown in Figs. 3 and 4. The cam tracks 35 are adapted to receive and be operated by said pins 34, and preferably are fastened to the totalizing mechanisms. In the present design said tracks are formed upon plates 36 constituting the bottom plates of the totalizing mechanisms, a bottom view thereof being shown in Fig. 8.

It will be noted that in Figs. 3 to 6 inclusive four pin holders are shown side by side and that in Fig. 8 four bottom plates are shown, the cam tracks 35 each occupying a different position upon its bottom plate and when viewed side by side, each cam track being out of line with its neighbor. The purpose of this arrangement is to prevent interference and to render each totalizing mechanism independent in its action, whereby any given totalizing mechanism may at any given point be brought into connection with either one or neither of its operating wheels irrespective of what at that point was the case with the preceding or will be the case with the succeeding totalizing mechanism. Of course the pin holders may all be made in a single piece if desired.

It will also be noted in Fig. 8 that the bottom plates and cam tracks are of different lengths. This is merely to call attention to the fact that totalizing mechanisms of different capacities may be employed, the totalizing mechanisms of higher capacities requiring of course more receiving wheels and consequently being longer than the totalizers of small capacity.

To illustrate the principle of operation of the machine let it be assumed that it is required to write a gas bill with the following items appearing in a single horizontal line in the following order reading by columns commencing at the left of the bill:

| | | | |
|---|---|---|---|
| A | State of meter last reading | 415,000 | cu. ft. |
| B | State of meter this reading | 475,000 | " " |
| C | Cubic feet consumed | 60,000 | " " |
| D | Price of amount consumed at 75¢ | $45.00 | |
| E | Discount for cash at 10% | 4.50 | |
| F | Net price | 41.50 | |

The bill would then appear thus:

| (A) cu. ft. | (B) cu. ft. | (C) cu. ft. | (D) $ | (E) $ | (F) $ |
|---|---|---|---|---|---|
| 415,000 | 475,000 | 60,000 | 45.00 | 4.50 | 41.50 |

This bill could be made out with six pairs of setting wheels and two totalizing mechanisms. The totalizing mechanisms would be three columns apart. It will be seen by referring to the bill that column B which is the minuend for the cubic feet is at the right of its subtrahend while column C which is the minuend for dollars is at the left of its subtrahend. This means that with the carriage traveling in its regular manner so as to print first in column A through in regular sequence to column F, totalizing mechanism No. 1 which is first to operate shall subtract while printing in column A (this being a subtrahend column), add while printing in column B (this representing the minuend and a positive quantity), subtract while printing in column C (the purpose being to return the totalizing mechanism to zero), and subsequently remain out of operation notwithstanding the operation of the setting wheels. Let it be supposed that the setting wheels 20 in front cause addition and the setting wheels 21 in the rear cause subtraction. It is apparent that for computing the cubic feet, in the above bill, totalizing mechanism No. 1 must be brought into mesh with the subtracting setting wheel at the first pair of setting wheels and into mesh with the adding setting wheel at the second pair, and into mesh with the subtracting setting wheel at the third pair and be held out of mesh for all the remaining pairs. This may be accomplished by setting the first pin 34 of the proper row of pockets so that it will swing the totalizing mechanism rearward at the first pair of setting wheels as shown in Fig. 3, the second pin of said row so that it will swing the totalizing mechanism forward at the second pair of setting wheels as shown in Fig. 4, the third pin of said row so that it will swing the totalizing mechanism rearward at the third pair of setting wheels, and the fourth and remaining pins of said row so that they will hold the receiving mechanism in a middle position for the remaining pairs of setting wheels as shown in Fig. 5.

In a similar manner totalizing mechanism No. 2 now comes into line with the first pair of setting wheels and it is apparent that said mechanism No. 2 must be made to first add, then subtract and again subtract, the last time for bringing mechanism No. 2 to zero. The procedure will be to so set the operating pins that totalizing mechanism No. 2 will be first brought forward then rearward and then held rearward. The operating pins in this last instance will be in a different pin holder, that is, in a different row of pockets, for the reason hereinabove pointed out. When the pins have once been set, any number of bills of the same form may be printed and calculated without readjusting or changing the arrangement of said pins.

It will be noted that with this construction the action of the controlling mechanism is positive, not depending in any manner upon springs or like devices. The cam positively holds the totalizing mechanism either in connection with the adding setting wheel or the subtracting setting wheel or else holds it in an intermediate position and positively prevents engagement with either of said wheels.

Although totalizers of various types and construction may be employed, a suitable one will now be described. It is like the one described in the above-mentioned Patent No. 782,605.

Referring more especially to Figs. 13 to 20 inclusive, 37 represents the totalizer shaft which is non-rotatably mounted in the totalizer casing 23 above mentioned. Upon this shaft are supported a plurality of sets or groups consisting of five principal parts, to-wit: the totalizing wheels 38, the carrying pinions 39, the receiving or accumulating wheels 22 above mentioned, the epicyclic wheels 22 above mentioned, the epicyclic pinions 40 and the intermediate wheels 41. Wheels 38, 22 and 41 are all freely rotatable about shaft 37 with the exception of wheel 41$^a$ located at the extreme right to correspond with the units column. This wheel is rigid on the shaft and its function is to form a fixed basis or foundation from which the rotatable parts of the totalizer move their definite amounts.

In each group of parts 42 represents a disk-like supporting piece which is splined to the shaft and has at its left portion a cylindrical hub 42$^a$ which forms a bearing whereon the intermediate wheel 41 is freely rotatable. The pin 43 extends toward the left from the piece 42 and serves as an axle whereon the carrying pinion 39 is freely rotatable. Said carrying pinion has four long and four short teeth which alternate with each other, as best shown in Fig. 14. By means of the long teeth said carrying pinion is alternately locked and rotated by the locking ring 38$^a$ and carrying teeth 38$^b$ respectively of the totalizing wheel 38 at its right. The short teeth serve to make the left portion of the carrying pinions a complete eight toothed gear and this left portion of the carrying pinions remains permanently in gear with the internal gear portion 38$^c$ of the next totalizing wheel to the left through the intermediation of gears 41, 22 and 40. As a result, the carrying action of pinion 39 is always transmitted to the next higher totalizing wheel 38. Each totalizing wheel has a set of numerical figures on its exterior cylindrical surface and is supported by the contact of its internal cylindrical surface 38$^a$ (which constitutes the aforesaid locking ring) upon the cylindrical edge of the supporting disk 42, said wheels 38 bearing loosely upon their supporting disks so as to be freely rotatable independently thereof.

The receiving or accumulating wheels 22 are plain spur gears having a comparatively large central aperture so that they may set over and be freely rotatable upon the points of the teeth of the internal wheels 41. Said accumulating wheels are narrow and their teeth project beyond the circumference of totalizing wheels 38 so that they may be engaged by the master wheels 20 and 21. The totalizing wheel 38$^d$ and supporting piece 42$^a$ (shown at the extreme left of Fig. 13) are slightly modified to give a finished appearance to the extreme left end of the totalizer.

Extending leftward from each accumulating wheel 22 are two pins 22$^a$ which constitute axles whereon the epicyclic pinions 40 are freely rotatable. Said epicyclic pinions remain in mesh with both intermediate wheel 41 and the internal gear portion 38$^c$ of wheel 38 for transmitting motion from one to the other. The aforesaid intermediate wheels 41 are wide faced spur pinions designed to both support the receiving or accumulating wheels 22 and also remain in mesh with the carrying pinions 38. The epicyclic pinions 40 serve to transmit the carrying action from the intermediate wheels 41 to the next higher totalizing wheels 38. As a result of the above-described construction of the totalizer it follows that the accumulating wheels 22 are rotatable in either direction and when rotated in one direction will add, and when rotated in the opposite direction will subtract.

I do not wish to claim herein any invention claimed in my said co-pending application for calculating machines, filed May 28, 1904, Serial No. 210,150.

What I claim as new and desire to secure by Letters Patent is:

1. In combination, a totalizing mechanism, operating means therefor, controlling means for positively determining in two directions whether at a given operating point said operating means shall operate the totalizing mechanism or not, said controlling means including two coöperating parts one of which travels relatively to the other for bringing said parts into coöperation, the action of the operating mechanism on the totalizer taking place simultaneously with the co-action of said parts of the controlling means, and means for adjusting the location of the operating point.

2. A calculating machine capable of addition and subtraction having a totalizing mechanism, means for operating the same, and controlling means including a traveling member for determining whether the operating means shall operate the totalizing mechanism for addition or shall operate it for subtraction at a given point in the travel of the traveling member.

3. A calculating machine capable of addition and subtraction, having a totalizing mechanism, means for operating the same and means including a traveling member for positively determining whether at a given point the operating mechanism shall or shall not operate upon the totalizing mechanism and if to operate, whether to add or subtract.

4. A calculating machine having a totalizing mechanism, a valuating member adapted to be connected thereto and disconnected therefrom, and a controlling mechanism having a traveling member, the connection between the valuating member and totalizing mechanism being at any given point positively established or prevented by the traveling member of the controlling mechanism.

5. A calculating machine having a totalizing mechanism, a valuating member adapted to be connected thereto to add or to subtract, at a given point, and also adapted to be disconnected therefrom to permit the totalizing mechanism to not operate at said given point; and controlling mechanism having a traveling member, the connection between the valuating member and totalizing mechanism being positively established for the predetermined one of the two operations, or the connection being positively prevented by the traveling member of the controlling mechanism.

6. A totalizing mechanism and operating means therefor, said operating mechanism including two parts one adapted to operate the totalizing mechanism for addition and the other for subtraction; in combination with means for positively determining in two directions whether the operating means shall actuate the totalizing mechanism or not, said controlling means including two co-operating parts one of which travels relatively to the other for bringing said parts into coöperation.

7. A totalizing mechanism, capable of adding and subtracting, operating mechanism therefor, and mechanism for controlling the connections between said totalizing mechanism and operating mechanism, said controlling mechanism including two parts one traveling relatively to the other and said controlling mechanism being brought into operation by the travel of one of said parts past the other, said controlling mechanism being adapted to determine whether the totalizing mechanism shall be operated to add or subtract or not be operated.

8. In combination, a totalizing mechanism, operating means therefor including means operating it to add, and means operating it to subtract; and means for positively determining the connection between said totalizing mechanism and its different operating means, said controlling mechanism being also adapted to disconnect said totalizing mechanism from its operating means, said controlling means including two coöperating parts one traveling relatively to the other for bringing said parts into coöperation.

9. A totalizing mechanism capable of operating in a plurality of directions and operating means therefor, said operating mechanism including two parts one adapted to operate the totalizing mechanism for addition and the other for subtraction; in combination with means for positively determining whether the operating means shall actuate the totalizing mechanism or not and if so in which direction, said determining means including two coöperating parts one of which travels relatively to the other for bringing said parts into coöperation.

10. In combination, totalizing mechanism adapted to add and subtract, operating mechanism therefor, and mechanism for controlling the connection between said totalizing mechanism and operating mechanism, said controlling mechanism comprising a plurality of parts, one of which is adapted to travel relatively to the operating mechanism and said traveling part of the controlling mechanism being adapted to coöperate with the stationary part thereof to determine whether the operating mechanism shall actuate the totalizing mechanism to add or subtract and said controlling mechanism being brought into operation by the travel of its traveling part.

11. In combination, totalizing mechanism adapted to add and subtract, operating mechanism therefor and mechanism for controlling the connection between said totalizing mechanism and operating mechanism, said controlling mechanism comprising a plurality of parts one of which is stationary and another of which is adapted to travel, one of the parts of said controlling mechanism being adapted to determine whether the operating mechanism shall actuate the totalizing mechanism to add or subtract and said controlling mechanism being brought into operation by the travel of its traveling part.

12. In combination, a totalizing mechanism adapted to add and subtract, operating mechanism therefor and mechanism for determining whether the operating mechanism shall actuate the totalizing mechanism to add or subtract, said controlling mechanism including two parts, one traveling relatively to the other, and one of the parts of the controlling mechanism being non-traveling relatively to the totalizing mechanism, said controlling mechanism being brought into operation by the traveling of the one of its parts past the other.

13. In combination totalizing mechanism adapted to add and subtract, operating mechanism therefor and mechanism for controlling the connection between said totalizing mechanism and operating mechanism, said controlling mechanism including a cam device having a plurality of parts one part being adapted to travel relatively to another part, the controlling mechanism being adapted to determine which effect the operating mechanism shall have upon the totalizing mechanism, addition or subtraction, the controlling mechanism being non-operative except when the parts thereof are brought into connection by the travel of its traveling part.

14. In combination, totalizing mechanism adapted to add and subtract, operating mechanism therefor and mechanism for controlling the connection between said totalizing mechanism and operating mechanism said controlling mechanism including a cam track and a pin, one adapted to travel relatively to the other for bringing the parts into operative connection, the cam track and pin being adapted to coöperate to determine which effect the operating mechanism shall have upon the totalizing mechanism, addition or subtraction.

15. In combination, totalizing mechanism adapted to add and subtract, operating mechanism therefor and mechanism for controlling the connection between said totalizing mechanism and operating mechanism said controlling mechanism including a cam track and a pin, the cam track traveling relatively to the pin and the parts being adapted to coöperate to determine which effect the operating mechanism shall have upon the totalizing mechanism, addition or subtraction, and the cam track and pin being brought into operation by their relative travel.

16. In combination, totalizing mechanism adapted to add and subtract, operating mechanism therefor and mechanism for controlling the connection between said totalizing mechanism and operating mechanism, said controlling mechanism including two parts one of which is stationary and the other traveling, one of said parts being a cam and the other of said parts being a pin for operating said cam to determine whether the totalizing mechanism shall add or subtract, said cam and pin being brought into coöperation by the traveling of one of said parts relatively to the other.

17. In combination, totalizing mechanism adapted to add and subtract, operating mechanism therefor, and mechanism for controlling the connection between said totalizing mechanism and operating mechanism, said controlling mechanism including a cam, a pin holder and a pin, the latter being removably mounted in the holder and adapted to be adjusted to different positions therein and the cam and pin being brought into operative relation by the travel of one of them, the position of the pin in the holder determining the effect of the operating mechanism upon the totalizing mechanism.

18. In combination, totalizing mechanism adapted to add and subtract, operating mechanism therefor, and mechanism for controlling the connection between said totalizing mechanism and operating mechanism, said controlling mechanism including a traveling cam, a stationary pin holder and a pin removably mounted in said holder whereby said pin may be adjusted to different positions therein, the cam and pin being brought into operative relation by the travel of said cam and the position of the pin in the holder determining whether the operating mechanism shall operate the totalizing mechanism to add or subtract.

19. In combination, totalizing mechanism adapted to add and subtract, operating mechanism therefor, and mechanism for controlling the connection between said totalizing mechanism and operating mechanism, said controlling mechanism including a stationary pin holder, a pin mounted therein and a cam adapted to travel into and out of engagement with said pin, said pin being adjustable in its holder substantially in the manner and for the purpose specified.

20. In combination, totalizing mechanism adapted to add and subtract, operating mechanism therefor, and mechanism for controlling the connection between said totalizing mechanism and operating mechanism, said controlling mechanism including a cam and a set of pins one traveling relatively to the other whereby the cam contacts the pins *seriatim*, the different pins occupying different positions relatively to the line of travel of the traveling part to thereby determine whether the totalizing mechanism shall add or subtract at the respective periods of contact of the cam with the respective pins.

21. In combination, totalizing mechanism adapted to add and subtract, operating mechanism therefor, controlling mechanism for controlling the connection between said totalizing mechanism and operating mechanism, said controlling mechanism including a set of pins and a cam, one adapted to travel relatively to the other, the controlling mechanism being brought into operation by the relative travel of the pins and cam, and said controlling mechanism being adapted to determine whether the totalizing mechanism shall add or subtract, and the pins of the above mentioned set occupying different positions transversely to the direction of travel, whereby the totalizing mechanism may add when the cam and pins are at one point of their relative travel and subtract when they are at another point of their relative travel.

22. In combination, totalizing mechanism adapted to add and subtract, operating mechanism therefor, and mechanism for controlling the connection between said totalizing mechanism and operating mechanism, said controlling mechanism including a pin holder, a set of pins adjustably mounted therein, and a cam track, said pins and cam track traveling relatively to each other and being brought into operation by their relative travel, the adjusted position of said pins in the holder determining whether the totalizing mechanism shall add or subtract when in connection with its operating mechanism.

23. In combination, totalizing mechanism adapted to add and subtract, operating mechanism therefor, and mechanism for controlling the connection between said totalizing mechanism and operating mechanism and determining whether the totalizing mechanism shall add or subtract, said controlling mechanism including a cam and pin device having one part adapted to travel relatively to the other and one part adjustable transversely to the path of the other, the adjusted position determining whether the action of the totalizing mechanism shall be in addition or subtraction, and the parts of the cam and pin device being brought into operation by their relative travel.

24. In combination, a totalizing mechanism adapted to add and subtract, and operating mechanism therefor, one adapted to travel relatively to the other, a controlling element traveling in unison with the traveling part and members adapted to act upon said controlling element for causing the totalizing mechanism to add at one point and subtract at another point of travel of said traveling means, said members being adjustable to different positions, one position for causing addition and another subtraction.

25. In combination, totalizing mechanism adapted to add and subtract, and operating mechanism therefor, one adapted to travel relatively to the other, and a controlling device for determining the effect of said operating mechanism upon the totalizing mechanism, said controlling device including a set of pins occupying different positions relatively to the path of the traveling part, and a cam adapted to travel and thereby contact said pins seriatim, the position of the different pins determining whether the totalizing mechanism shall add or subtract when the cam is in contact with them.

26. In combination, a traveling totalizing mechanism adapted to add and subtract, operating mechanism therefor, and means including a part traveling in unison with the totalizing mechanism for positively determining whether the operating mechanism shall add or subtract.

27. In combination, a traveling totalizing mechanism adapted to add and subtract, operating mechanism therefor, and means traveling in unison with the totalizing mechanism for positively determining whether the operating mechanism shall add or subtract, or not operate.

28. In a calculating machine, the combination of a stationary frame, a carriage traveling thereon, a totalizer mounted on one and totalizer operating mechanism mounted on the other, said totalizer being adapted to add and subtract and said totalizer operating mechanism including two members, one for causing addition and the other subtraction, either of which members may operate the totalizer at the same decimal place therein, and means operated by the travel of the carriage for determining by which of said members the totalizer shall be operated at a given point of travel of the carriage.

29. In combination, a traveling totalizing mechanism adapted to both add and subtract, and two separate members for operating the same at the same given point, one to cause addition and the other subtraction, and means traveling in unison with the totalizing mechanism for determining with which of said operating members said totalizing mechanism shall be in operative connection.

30. In combination, a traveling totalizing mechanism adapted to both add and subtract, and two separate members for operating the same, one to cause addition and the other subtraction, said totalizing mechanism and operating members being relatively movable in a direction transverse to the path of the traveling totalizing mechanism and means for moving the transversely movable part for determining with which of said operating members the totalizing mechanism shall be in connection.

31. In combination, a traveling totalizing mechanism adapted to both add and subtract, and two separate members for operating the same, one to cause addition and the other subtraction, said totalizing mechanism and operating members being movable relative to each other in a direction transverse to the path of the traveling totalizing mechanism, and means traveling in unison with the totalizing mechanism for determining with which of said operating members the totalizing mechanism shall be brought into connection.

32. In a recording calculating machine capable of printing the combination with the traveling carriage of a totalizing mechanism adapted to add and subtract, and operating mechanism therefor which includes two acting members, one for causing addition and the other subtraction; and means traveling in unison with the carriage for determining which of said operating members shall be in connection with the totalizing mechanism during the act of printing.

33. In a calculating machine, the combination of stationary frame, a carriage traveling thereon, a totalizer mounted on one and totalizer-operating mechanism mounted on the other, the totalizer being adapted to add and subtract, and the operating mechanism comprising two driving members, one for causing addition and the other subtraction, and having fixed axes of rotation, and said totalizer being movable so as to engage either one of said driving members, and means upon the carriage for thus moving said totalizer to thereby determine with which of said driving members said totalizer shall be engaged.

34. In combination, a traveling totalizing mechanism adapted to add and subtract and operating means therefor including two different setting wheels, one for causing addition and the other subtraction, said totalizing mechanism being also movable in a direction transverse to its path of travel to thereby become engaged by one or the other of said setting wheels; and means traveling in unison with the totalizing mechanism for controlling said transverse movement of the totalizing mechanism.

35. In combination, a traveling totalizing mechanism adapted to add and subtract and operating mechanism therefor including two different setting wheels on opposite sides thereof one for causing addition and the other subtraction, said totalizing mechanism being movable toward and away from said setting wheels transversely to the axes thereof and said wheels having stationary axes far enough apart so that the totalizing mechanism may be in connection with either one or neither of said setting wheels, and means traveling simultaneously with the totalizing mechanism for positively determining the position of said totalizing mechanism in relation to its distance from the axes of the setting wheels.

36. In combination, a traveling totalizing mechanism adapted to add and subtract and operating means therefor including two different setting wheels, one for causing addition and the other subtraction, a bar the axis whereof remains fixed, said totalizing mechanism being pivotally mounted upon said bar so as to swing transversely thereto for moving into engagement with one or the other or neither of said two setting wheels and means traveling in unison with the totalizing mechanism for producing its swinging movement.

37. In combination, a traveling totalizing mechanism adapted to add and subtract and operating means therefor including two different setting wheels, one for causing addition and the other subtraction, a bar the axis whereof remains fixed, said totalizing mechanism being pivotally mounted upon said bar so as to swing transversely thereto for moving into engagement with one or the other or neither of said two setting wheels, and a cam and pin device part of which travels in unison with the totalizing mechanism for causing the movement thereof transverse to said bar.

38. In combination, a traveling totalizing mechanism adapted to add and subtract and operating means therefor including two different setting wheels, one for causing addition and the other subtraction, a bar the axis whereof remains fixed, said totalizing mechanism being pivotally mounted upon said bar so as to swing transversely thereto for moving into engagement with one or the other or neither of said two setting wheels, a stationary pin and a cam traveling in unison with the totalizing mechanism and adapted to coöperate with said pin for determining the position thereof transverse to said bar.

39. In combination, a traveling totalizing mechanism adapted to add and subtract and operating means therefor including two different setting wheels, one for causing addition and the other subtraction, a bar the axis whereof remains fixed, said totalizing mechanism being pivotally mounted upon said bar so as to swing transversely thereto for moving into engagement with one or the other or neither of said two setting wheels, a stationary pin and a cam track upon the totalizing mechanism adapted to engage said pin for positively determining the position of the totalizing mechanism transverse to said bar.

40. In combination, a frame, a carriage traveling thereon, a totalizer mounted on one and totalizer-operating mechanism mounted on the other, the totalizer being adapted to add and subtract and said totalizer-operating mechanism including an adding and subtracting member, said totalizer being capable of occupying two positions at any given point of travel of the carriage, in one of which positions the totalizer is in engagement with the adding member and in the other with the subtracting member; and means including a part mounted on the carriage for positively determining which of said two positions the totalizer shall assume at said given point of travel.

41. In combination, totalizing mechanism and operating mechanism therefor, one adapted to travel relatively to the other, said totalizing mechanism being adapted to add and subtract, and said operating mechanism including two acting members, one for addition and the other for subtraction, said totalizing mechanism being capable of occupying two positions in one of which it is in engagement with the adding member and in the other with the subtracting member; and a cam and a pin adapted to coöperate with each other and one of them traveling with the traveling part of the machine for positively determining which of said two positions the totalizing mechanism shall assume.

42. In combination, a traveling totalizing mechanism adapted to add and subtract, and operating mechanism therefor, said operating mechanism including two active members one for addition and the other for subtraction, said totalizing mechanism being capable of occupying at least two positions, in one of which it is in engagement with the adding member and the other with the subtracting member; and a cam and pin device one of the parts whereof travels in unison with the totalizing mechanism for positively determining which of said two positions the totalizing mechanism shall assume.

43. In a calculating machine, a frame, a carriage traveling thereon, a totalizer, and totalizer-operating mechanism, said totalizer being adapted to add and subtract, and said operating mechanism including an adding member and a subtracting member, said totalizer being capable of occupying three positions for a given point of travel of the carriage, in one of which positions it is in engagement with the adding member, in another with the subtracting member, and in the third with neither of said members; and means traveling with the carriage for positively determining which of said three positions the totalizer shall occupy.

44. In combination, totalizing mechanism and operating mechanism therefor, one adapted to travel relatively to the other, said totalizing mechanism being adapted to add and subtract and said operating mechanism including two acting members, one for addition and the other for subtraction, said totalizing mechanism being capable of occupying three positions in one of which it is in engagement with the adding member, in another with the subtracting member and in the third with neither of said members; and a cam and a pin adapted to coöperate with each other and one of them traveling for positively determining which of said three positions the totalizing mechanism shall assume.

45. In combination, a traveling totalizing mechanism adapted to add and subtract, and operating mechanism therefor, said operating mechanism including two acting members one for addition and the other for subtraction, said totalizing mechanism being capable of occupying three positions in one of which it is in engagement with the adding member, in another with the subtracting member, and another with neither of said acting members; and a cam and a pin adapted to coöperate and one of them traveling in unison with the totalizing mechanism for positively determining which of said three positions the totalizing mechanism shall assume.

46. In a calculating machine, the combination of a totalizing mechanism adapted to add and subtract; a valuating member rotating always in the same direction in addition and rotating different amounts depending upon the value of the digit to be registered; the totalizing mechanism and valuating member being adapted to travel relatively to each other; means for transmitting two kinds of motion from said valuating member to the totalizing mechanism, one for causing addition and the other subtraction, and other means for controlling said transmitting means to determine at any given point the kind of motion to be imparted to the totalizing mechanism at that point.

47. In a calculating machine, the combination of a traveling totalizing mechanism adapted to add and subtract; a valuating wheel rotating always in the same direction in addition and rotating different amounts depending upon the value of the digit to be registered; connections for transmitting motion from said valuating wheel to the totalizing mechanism to add; other connections for transmitting motion from said valuation wheel to the totalizing mechanism to subtract; and means including a part traveling in unison with the totalizing mechanism for determining at any given point from which of said connections the totalizing mechanism shall be operated at that point.

48. In a calculating machine, the combination of a traveling totalizing mechanism adapted to add and subtract; a valuating wheel rotating always in the same direction in addition and rotating different amounts depending upon the value of the digit to be registered; connections for transmitting motion from said valuating wheel to the totalizing mechanism to add; other connections for transmitting motion from said valuating wheel to the totalizing mechanism to subtract; and means including a part capable of occupying two positions for determining from which of said connections the totalizing mechanism shall be operated.

49. In a calculating machine, the combination of a traveling totalizing mechanism adapted to add and subtract; a valuating wheel rotating always in the same direction in addition and rotating different amounts depending upon the value of the digit to be registered; connections for transmitting motion from said valuating wheel to the totalizing mechanism to add; other connections for transmitting motion from said valuating wheel to the totalizing mechanism to subtract; and means including an adjustable pin 34 capable of being adjusted to two different positions for determining from which of said connections the totalizing mechanism shall be operated.

50. In a calculating machine the combination of a traveling totalizing mechanism adapted to add and subtract; a valuating wheel rotating always in the same direction in addition and rotating different amounts depending upon the value of the digit to be registered; connections for transmitting motion from said valuating wheel to the totalizing mechanism to add; other connections for transmitting motion from said valuating wheel to the totalizing mechanism to subtract; and a cam and pin device for determining from which of said connections the totalizing mechanism shall be operated, one part of said cam and pin device traveling in unison with the totalizing mechanism and the other part being stationary and adapted to be contacted by said traveling part.

51. In a calculating machine, the combination of a traveling totalizing mechanism adapted to add and subtract; a valuating wheel rotating always in the same direction in addition and rotating different amounts depending upon the value of the digit to be registered; connections for transmitting motion from said valuating wheel to the totalizing mechanism to add; other connections for transmitting motion from said valuating wheel to the totalizing mechanism to subtract; and a stationary pin and a cam mounted upon the totalizing member and adapted to coöperate with said pin for determining from which of said connections the totalizing mechanism shall be operated.

52. In a calculating machine, the combination of a traveling totalizing mechanism adapted to add and subtract; a valuating wheel rotating always in the same direction in addition and rotating different amounts depending upon the value of the digit to be registered; connections for transmitting motion from said valuating wheel to the totalizing mechanism to add; other connections for transmitting motion from said valuating wheel to the totalizing mechanism to subtract; a row of pins and a cam adapted to coöperate with them *seriatim* for determining from which of said connections the totalizing mechanism shall be operated, said pins occupying different positions relatively to the path of travel of the totalizing mechanism for the purpose described.

53. In combination, a plurality of totalizing mechanisms adapted to add and subtract, operating means therefor and means for positively controlling each totalizing mechanism independently to govern whether they shall add or subtract or be not operated by the operating means.

54. In combination, a plurality of totalizing mechanisms, operating means therefor and means for positively controlling in two directions each totalizing mechanism independently to govern whether at any given point it shall or shall not be operated by the operating means.

55. In combination, a plurality of totalizing mechanisms adapted to add and subtract, operating means therefor and means for positively controlling each totalizing mechanism independently to govern whether at any given point it shall be operated by the operating means to add or subtract.

56. In combination, a plurality of totalizers and operating means therefor, the totalizers and operating means being relatively movable so that the totalizers may be operated one after another and means for governing the operation of each totalizing mechanism independently, said governing means including a stationary part for each totalizer, and a movable part for each totalizer.

57. In combination, a plurality of traveling totalizers, operating means therefor, the totalizers being adapted to travel past the operating means one after the other, and means for governing the operation of each totalizer independently, said governing means including a separate stationary part of each totalizer and a separate movable part for each totalizer.

58. In combination, a plurality of traveling totalizers adapted to add and subtract, a stationary operating wheel, the totalizers being adapted to travel past the operating wheel one after another, and governing means for predetermining whether any given totalizer shall operate or not when it comes opposite to the operating wheel, said governing means including a stationary independent adjustable member for each different totalizer.

59. In combination, a plurality of traveling totalizing mechanisms adapted to add and subtract, operating means therefor, the totaling mechanisms being adapted to travel past the operating means one after the other, and means for predetermining whether any given totalizing mechanism when it comes opposite to the operating means shall be operated to add or subtract.

60. In combination, a plurality of traveling totalizing mechanisms adapted to add and subtract, operating means therefor, the totalizing mechanisms being adapted to travel past the operating means one after the other, and means for predetermining whether any given totalizing mechanism when it comes opposite to the operating means shall operate or not operate and if operating whether to add or subtract.

61. A calculating machine having a totalizing mechanism, operating means therefor and means for determining whether the totalizing mechanism shall be operated to add or subtract, said controlling means including two coöperating parts one of which travels relatively to the other for moving into and out of operative contact therewith, one of the said two parts of the controlling means being hand adjustable into a plurality of positions to thereby positively predetermine whether the operating mechanism shall or shall not produce change in the totalizing mechanism.

62. A calculating machine having a totalizing mechanism, operating means therefor and means for determining whether the totalizing mechanism shall operate to add, or to subtract or shall not operate, said controlling means including two coöperating parts one of which travels relatively to the other, one of said two parts being adjustable by hand into any of three positions to thereby predetermine whether the operating mechanism shall cause addition or subtraction or no change in the totalizing mechanism.

63. A calculating machine having a totalizing mechanism, operating means therefor one adapted to travel past the other and means for positively determining whether the operating means shall or shall not operate the totalizing mechanism when the totalizing mechanism and operating means are in juxtaposition, said controlling means including two coöperating parts one of which travels in unison with the traveling part of the machine to be brought into coöperation with its coöperating part, and one of the said two parts being hand adjustable into a plurality of positions to thereby positively predetermine whether the operating mechanism shall or shall not operate the totalizing mechanism when the latter are in juxtaposition.

64. A calculating machine having a totalizer adapted to add and subtract, operating means therefor, one adapted to travel past the other, and controlling means including two coöperating parts, one of which travels in unison with the traveling part of the machine to be brought into coöperation with its coöperating part, one of the two parts being hand adjustable into a plurality of positions to thereby positively predetermine whether, if any operation is to occur, the operating mechanism shall cause addition or subtraction.

65. In a calculating machine, the combination of a setting wheel; a plurality of totalizing mechanisms adapted to travel past the setting wheel and when opposite thereto to be either operated thereby or not operated thereby depending upon the position of one of the parts relatively to the other, one of said parts being movable transversely to the path of travel of the totalizing mechanism; and means for positively determining the transverse position of such transversely movable part, said controlling means including cam and pin devices each totalizing mechanism carrying a part of the cam and pin devices and each of said parts being offset from the others for the purpose described.

66. In a calculating machine the combination of a setting wheel; a plurality of totalizing mechanisms adapted to be operated thereby *seriatim;* a set of cam tracks, one for each totalizing mechanism for positively determining whether or not the respective totalizing mechanism shall be in operative connection with the setting wheel when the two are opposite to each other; and a separate pin for each cam track, said pins being offset relative to each other with respect to the path of travel of the totalizing mechanism and said cam tracks being correspondingly offset for non-interference with pins not their own.

67. In a totalizing mechanism the combination of a stationary setting wheel; a plurality of traveling totalizing mechanisms adapted to be operated thereby *seriatim;* a set of cam tracks one on each totalizing mechanism for positively determining whether or not any given totalizing mechanism shall be in operative connection with the setting wheel when the two are opposite each other, and a separate stationary pin for each cam track, the pins being out of line with each other and the cam tracks being located in relatively different positions on the respective totalizing mechanisms whereby each cam track coacts with its individual pin and no other.

68. In a calculating machine the combination of a pair of setting wheels located opposite to each other one for addition and the other for subtraction; a plurality of totalizing mechanisms all adapted to add and subtract and adapted to travel past said setting wheels; and means for controlling each totalizing mechanism when opposite to said setting wheels to determine whether the totalizing mechanism shall be in connection with the adding or subtracting setting wheel or neither of them, said controlling means including a separate cam and pin device for each totalizing mechanism.

69. In a calculating machine the combination of a totalizing mechanism adapted to add and subtract and two setting wheels rotating in the same plane so as to be opposite to each other, the setting wheels and totalizing mechanism being relatively shiftable and also relatively movable transversely to the line of shifting, and means including a traveling part for positively moving one of the parts to establish connection between the totalizing mechanism and one or the other of the setting wheels or neither one thereof.

70. In a calculating machine the combination of a traveling totalizing mechanism adapted to add and subtract; two shafts parallel with the line of travel of the totalizing mechanism, a set of setting wheels on each shaft, a wheel on one shaft being opposite to a wheel on the other and the wheels of one shaft being for addition and the other for subtraction; and means including a part traveling in unison with the totalizing mechanism and operative at each pair of setting wheels for establishing connection between the totalizing mechanism and a predetermined one of said setting wheels.

71. In a calculating machine the combination of a traveling totalizing mechanism adapted to add and subtract; two shafts parallel with the line of travel of the totalizing mechanism, a set of setting wheels on each shaft, a wheel on one shaft being opposite to a wheel on the other and the wheels of one shaft being for addition and the other for subtraction; and means including a part traveling in unison with the totalizing mechanism and operative at each pair of setting wheels for establishing connection between the totalizing mechanism and a predetermined one or neither of said setting wheels.

72. In combination, totalizing mechanism adapted to add and subtract, operating means therefor, and mechanism for controlling the connection between said totalizing mechanism and its operating mechanism, said controlling mechanism including a set of pins and a cam, one adapted to travel relatively to the other, the controlling device being brought into operation by the relative travel of the pins and cam and said controlling device being adapted to determine whether the totalizing mechanism shall add or subtract, or not operate, and the pins of the above mentioned set occupying different positions relatively to the path of travel whereby the totalizing mechanism may add at one point of the travel and subtract at another point of the travel, and not operate when at another point of the travel.

73. In combination, a plurality of totalizers each capable of addition and subtraction, a valuating member rotating always in the same direction; two sets of connections, one for transmitting motion from the valuating member to the totalizers to add and the other for transmitting motion from the valuating member to subtract, only one set of connections being operative upon the totalizer at any one time; means for bringing said totalizers successively into juxtaposition with both sets of connections simultaneously, and means for controlling said connections, said controlling means being operative upon each totalizer individually when the totalizer is in juxtaposition with said connections whereby one totalizer may add at the operating point, and another totalizer subtract at that point.

74. In combination a totalizing mechanism, actuating means therefor, and controlling means including two co-acting parts one of which is non-traveling and the other of which travels for bringing said parts into coöperative relation at a given point in the travel of the traveling part, said actuating means being operative or non-operative upon said totalizing mechanism at the time of co-action of the parts of the controlling mechanism depending upon the predetermined position of the non-traveling one of said co-acting parts.

75. In combination, a traveling totalizing mechanism adapted to add and subtract, actuating means therefor including means operative upon said totalizing mechanism at a given point of its travel to actuate it to add and other means operative at the same point of travel to actuate said totalizing mechanism to subtract; and means traveling in unison with the totalizing mechanism and operative at said given point of travel for determining which of the said two actuating means shall operate upon the totalizing mechanism at said given point of travel of the totalizing mechanism.

76. In combination, a traveling totalizing mechanism adapted to add and subtract, a member for actuating it to add, another member for actuating it to subtract, means traveling in unison with the totalizing mechanism and operative thereon at a given point of the travel thereof for selecting which of the two actuating members shall operate upon said totalizing mechanism at that point, the one producing addition or the one producing subtraction; and differential mechanisms common to both of said actuating members for operating them.

77. In a recording calculating machine having printing mechanism and a traveling paper carriage, the combination with said carriage and printing mechanism, of a totalizing mechanism adapted to add and subtract and operating means therefor including two separate actuating members having opposite effects thereon, one addition and the other subtraction, said actuating members each being capable of being connected to the totalizing mechanism at the same printing point; and controlling mechanism including a cam and pin one of which is stationary and the other travels in unison with the paper carriage, and said cam and pin coming into coöperative relation at the same aforesaid printing point, and the relative positions of the cam and pin at this point determining the relationship of the totalizing mechanism relatively to the actuating means.

78. In a calculating machine, a stationary frame, a carriage traveling thereon, a totalizer mounted on one and totalizer-operating means mounted on the other, the totalizer being adapted to add and subtract, the totalizer-operating means comprising two separate actuating members one for producing addition and the other for subtraction, said actuating members being non-traveling relatively to each other and both of them being capable of acting upon the totalizer at the same point of travel of the carriage: in combination with controlling means for determining which of the two actuating members shall be connected to the totalizer at said point of travel, said controlling means comprising two co-acting parts one of which is mounted on the carriage.

79. In a calculating machine, a stationary frame, a carriage traveling thereon, a totalizer mounted on one and totalizer-operating means mounted on the other, the totalizer being adapted to add and subtract, the totalizer-operating means comprising two separate actuating members one for producing addition and the other for subtraction, said actuating members being non-traveling relatively to each other and both of them being capable of acting upon the totalizer at the same point of travel of the carriage, means common to both of said actuating members for operating them; in combination with controlling means for determining which of the two actuating members shall be connected to the totalizer at said point of travel, said controlling means comprising two co-acting parts one of which is mounted on the carriage.

80. In a calculating machine, a stationary frame, a carriage traveling thereon, a reversible totalizer adapted to add and subtract mounted on said carriage, totalizer-operating means mounted on said frame and including an adding member and a subtracting member located in the same plane and differential mechanism for operating said actuating members; in combination with controlling means for determining which of the two actuating members shall be connected to the totalizer at a given point of travel thereof, said controlling means comprising two co-acting parts, one of which is mounted on the carriage.

81. A typewriter having a framework, a carriage traveling thereon and printing mechanism; in combination with a calculating attachment comprising a pair of setting wheels mounted in said framework one opposite to the other; a totalizing mechanism mounted upon said carriage and adapted to pass said setting wheels, said totalizing mechanism being shiftable transversely to the path of the carriage for coming into engagement with one or the other of said setting wheels when brought opposite to them by the travel of the carriage; and controlling mechanism for shifting said totalizing mechanism transversely to the path of the carriage, said controlling mechanism including a pin traveling with the totalizing mechanism and a stationary cam adapted to operate said pin when the totalizing mechanism is opposite to said setting wheels.

82. A typewriter having a framework, a carriage traveling thereon and printing mechanism; in combination with a calculating attachment comprising a pair of setting wheels mounted in said framework one opposite to the other at some distance apart; a reversible totalizing mechanism adapted to pass between said setting wheels without engaging either of them, said totalizing mechanism being pivotally mounted on said carriage and adapted to swing transversely to the path of the carriage for moving into engagement with one or the other of said setting wheels, said setting wheels rotating in opposite directions whereby one produces addition and the other subtraction, and positive acting means for shifting said totalizing mechanism transversely to the path of travel of the carriage, said shifting means including a pin fastened to said totalizing mechanism and a stationary double cam.

83. A calculating machine having a totalizer adapted to add and subtract, operating means therefor, one adapted to travel past the other and controlling means for positively determining whether the operating means shall produce addition or subtraction on the totalizer when it and the operating means are in juxtaposition, said controlling means including two coöperating parts one of which travels in unison with the traveling part of the machine, one of the said two parts being hand adjustable into a plurality of positions to thereby determine whether the operating mechanism shall produce addition or subtraction in the totalizer.

84. In combination, a totalizer, operating means therefor, including means operating it to add and means operative at the same point of action operating it to subtract; and means for governing the relation between the totalizer and its operative means to determine by which part thereof the totalizer shall be operated, said controlling means including two parts, one of which travels relatively to the other for coming into coöperative relation therewith and one of which is adapted to be manually adjusted to different positions previous to coöperation whereby the operator may select which of the two parts of the operating means shall influence the totalizer at the aforesaid point of action.

85. A calculating machine capable of printing, provided with a plurality of totalizers each capable of addition and subtraction, and a device for controlling the totalizers individually, so that at the column printing any given totalizer may be made automatically to add, subtract, or remain neutral irrespective of the operations of the other totalizers at such point.

86. A calculating machine provided with a traveling totalizer capable of addition and subtraction, two setting mechanisms operative at the same point of travel upon the same totalizer and a controlling device capable of establishing connection with a predetermined one of said setting mechanisms.

87. A calculating machine having different setting members, a totalizer and a controlling device, said totalizer being capable of addition and subtraction and adapted to be brought successively into operative relation with different ones of said setting members to effect an operation at the second setting member different from the operation at the first setting member, said different operation resulting from preadjustment of the controlling device.

88. In a calculating machine, the combination of a totalizing mechanism: a setting member: and means controlled by said totalizing mechanism for either making or breaking the operative connections between said totalizing mechanism and said setting member.

89. In a calculating machine, the combination of a totalizing mechanism and a setting wheel operative upon said totalizing mechanism, means for driving said setting wheel: and means part of which is upon said totalizing mechanism for bringing said setting wheel into position to be operative or into position to be non-operative upon said totalizing mechanism.

90. In a calculating typewriter attachment, a plurality of totalizers, operating means therefor, and controlling means adapted to control each totalizer independently to thereby determine whether a given totalizer shall operate, and if operated whether it shall add or subtract.

91. In a calculating typewriter attachment, a traveling typewriter carriage, a plurality of totalizers traveling therewith to be brought to the operating point, differential mechanism operated by the typewriter keys, and independent switches for each totalizer for determining what its actions shall be at the operating point.

92. In a calculating machine, a totalizer adapted to both add and subtract, operating means therefor adapted to cause the totalizer to either add or subtract at any predetermined point, type mechanism adapted to strike the paper at the printing point, and paper supporting mechanism, the type mechanism and the paper supporting mechanism traveling relatively to each other for the letter space advance, and a cam mechanism, part of which is stationary relative to the paper supporting mechanism and the other part of which is stationary relative to the type mechanism, and both parts coöperating to control the operating means to determine whether it shall cause the totalizer to add or to subtract.

93. In a calculating machine the combination of totalizing mechanism capable of addition and subtraction, means for operating said totalizing mechanism by inserting numbers therein digit by digit, and means including a traveling member for positively determining whether at a given point the operating mechanism shall or shall not operate on the totalizing mechanism and if to operate whether to add or to subtract.

94. In a calculating machine the combination of totalizing mechanism adapted to add and subtract, setting means moving relatively to said totalizing mechanism, whereby numbers are inserted therein digit by digit, and means including a traveling member to determine for a given position of said traveling member whether said totalizing mechanism shall add, subtract or not calculate.

95. In a calculating machine the combination of a totalizing mechanism adapted to add and subtract, a setting mechanism adapted to insert numbers therein digit by digit, said totalizing mechanism moving relatively to said setting mechanism, and means including a traveling member to determine for a given position of said traveling member whether said totalizing mechanism shall add, subtract or not calculate.

96. In a calculating machine the combination of a totalizing mechanism adapted to add and subtract, setting mechanism adapted to insert numbers therein one digit at a time, said totalizing mechanism moving relatively to said setting mechanism, means including a traveling member to determine for a given position of said traveling member whether said totalizing mechanism shall add, subtract or not calculate, and manually operated means for reversing said totalizing mechanism whereby errors may be corrected.

97. In a calculating machine the combination of totalizer actuating mechanism, two totalizers simultaneously operable by said mechanism, and means determining for each totalizer independently whether, during the insertion of a number, said totalizer shall be operated positively, negatively or not be operated at all.

98. In a calculating machine the combination of a totalizer actuating mechanism, two totalizers operable by said mechanism and adapted to have numbers inserted in them digit by digit by said mechanism, and means determining for each totalizer independently whether, during the insertion of a number, said totalizer shall be operated positively, negatively or not be operated at all.

99. In a calculating machine the combination of a totalizing mechanism capable of addition and subtraction, means for operating said totalizing mechanism by inserting numbers therein digit by digit, means including a traveling member for positively determining whether at a given point the operating mechanism shall or shall not operate on the totalizing mechanism and if to operate whether to add or to subtract, and manually operated means for reversing said totalizing mechanism whereby errors may be corrected.

100. In a calculating machine the combination of totalizing mechanism adapted to add and subtract, setting means movable relatively to said totalizing mechanism whereby numbers are inserted therein digit by digit, means including a traveling member to determine for a given position of said traveling member whether said totalizing mechanism shall add, subtract or not calculate, and manually operated means for reversing said totalizing mechanism whereby errors may be corrected.

101. In a calculating machine the combination of a totalizer actuating mechanism, two totalizers adapted to have numbers simultaneously inserted in them by said mechanism digit by digit, and means determining for each totalizer independently whether, during the insertion of a number, said totalizer shall be operated positively, negatively or not be operated at all.

102. In a calculating machine the combination of totalizer actuating mechanism, two totalizers simultaneously operable by said mechanism, and means including a traveling member determining for each totalizer independently whether, during the insertion of a number, said totalizer shall be operated positively, negatively or not be operated at all.

103. In a calculating machine the combination of totalizer actuating mechanism, two totalizers adapted to have numbers simultaneously inserted in them by said mechanism, digit by digit, said actuating mechanism traveling relatively to said totalizers, and means determining for each totalizer independently whether, during the insertion of a number, said totalizer shall be operated positively, negatively or not be operated at all.

104. In a calculating machine the combination of totalizer actuating mechanism, two totalizers adapted to have numbers simultaneously inserted in them by said mechanism digit by digit, said totalizers being fixed relative to each other and moving relative to said actuating mechanism during the insertion of a number, and means determining for each totalizer independently whether, during the insertion of a number, said totalizer shall be operated positively, negatively or not be operated at all.

105. In a calculating machine the combination of totalizer actuating mechanism, two totalizers adapted to have numbers simultaneously inserted in them by said mechanism digit by digit, means determining for each totalizer independently whether, during the insertion of a number, said totalizer shall be operated positively, negatively, or not be operated at all, and manually operable mechanism adapted to reverse the operation of said totalizers whereby an error may be corrected simultaneously in both totalizers irrespective of their condition as determined by said determining means.

106. In a calculating machine the combination of totalizer actuating mechanism, two totalizers simultaneously operable by said mechanism, means including a traveling member determining for each totalizer independently whether, during the insertion of a number, said totalizer shall be operated positively, negatively, or not be operated at all, and manually operated mechanism adapted to reverse the operation of said totalizers whereby an error may be corrected simultaneously in both totalizers irrespective of their condition as determined by said determining means.

107. In a calculating machine the combination of totalizer actuating mechanism, two totalizers adapted to have numbers simultaneously inserted in them digit by digit by said mechanism, said inserting mechanism traveling relatively to said totalizers, means determining for each totalizer independently whether, during the insertion of a number, such totalizer shall be operated positively, negatively, or not be operated at all, and manually operable mechanism adapted to reverse the operation of said totalizers whereby an error may be corrected simultaneously in both totalizers irrespective of their condition as determined by said determining means.

108. In a calculating machine the combination of totalizer actuating mechanism, two totalizers adapted to have numbers simultaneously inserted in them digit by digit by said mechanism, said totalizers being fixed relatively to each other but moving relatively to said inserting mechanism during the insertion of a number, means determining for each totalizer independently whether such totalizer shall be operated positively, negatively or not be operated at all, and manually operated mechanism adapted to reverse the operation of both totalizers whereby an error may be corrected simultaneously in both totalizers irrespective of their condition as determined by said determining means.

109. The combination with typewriting mechanism; computing mechanism operable concomitantly with said typewriting mechanism; and a control for governing action of said computing mechanism, including a plurality of sections having tracks therein, said sections being adjustable to vary the relative positions of said tracks.

110. The combination with typewriting mechanism; computing mechanism operable concomitantly with said typewriting mechanism; and a control for governing the action of said computing mechanism, including a plurality of sections having tracks therein, said sections being interchangeable to vary the relative positions of said tracks thus to vary the sequence of action of the said computing mechanism.

In witness whereof, I have hereunto subscribed my name in the presence of two witnesses.

HYMAN ELI GOLDBERG.

Witnesses:
 HOWARD M. COX,
 CAROLYN RAFTERY.